United States Patent [19]

Denney et al.

[11] Patent Number: 4,995,896
[45] Date of Patent: Feb. 26, 1991

[54] TAKEOUT JAWS

[75] Inventors: Michael L. Denney, Denton; Shelby M. Withrow, Paradise; John M. Delancey, Sr., Fortworth, all of Tex.

[73] Assignee: Union Oil Company of California, Los Angeles, Calif.

[21] Appl. No.: 401,038

[22] Filed: Aug. 31, 1989

[51] Int. Cl.$^5$ .............................................. C03B 9/44
[52] U.S. Cl. ........................................ 65/260; 65/172; 65/374.15; 294/86.4; 294/902
[58] Field of Search ............... 65/260, 172, 374.15; 294/902, 87.22, 86.4, 87.24

[56] References Cited

U.S. PATENT DOCUMENTS

| 1,436,825 | 11/1922 | Sandford | 65/375.14 X |
| 2,100,497 | 11/1937 | White | 294/902 |
| 3,655,233 | 4/1972 | Twist | 294/902 |
| 3,938,847 | 2/1976 | Peyton | 294/87.24 |
| 4,298,373 | 11/1981 | Mumford et al. | 65/260 |

FOREIGN PATENT DOCUMENTS

| 1481757 | 3/1969 | Fed. Rep. of Germany | 294/87.24 |
| 2501660 | 7/1976 | Fed. Rep. of Germany | 65/374.15 |
| 2722689 | 11/1978 | Fed. Rep. of Germany | 294/902 |
| 0854709 | 8/1981 | U.S.S.R. | 294/902 |
| 1006209 | 3/1983 | U.S.S.R. | 294/902 |

Primary Examiner—Robert L. Lindsay
Attorney, Agent, or Firm—Michael A. Kondzella; Clark E. De Larvin; Gregory F. Wirzbicki

[57] ABSTRACT

A takeout jaw for use in a bottle-forming machine is formed in a semicircular shape and contains a spring clip for holding immovably a piece of non-metallic contact material within a pocket in the body of the takeout jaw.

12 Claims, 3 Drawing Sheets

TAKEOUT JAWS

FIELD OF THE INVENTION

This invention relates to the field of glassmaking. In one of its more particular aspects, this invention relates to a fixture for use in a machine for lifting hot glass bottles from the molds in which they are formed. In another of its more particular aspects, this invention relates to the combination of such a fixture and a non-metallic contact material especially adapted for use in the fixture.

BACKGROUND OF THE INVENTION

Hot glass, especially when formed into various shapes in the manufacture of glass containers such as bottles, is susceptible to being damaged by contact with glass processing equipment. Most of the equipment with which hot glass comes in contact in the hot end process area during the manufacture of glass bottles is fabricated from metallic materials such as stainless steel and other alloys. However, in certain areas of the hot end processing of glass bottles, it has been found desirable to utilize non-metallic materials such as graphite, asbestos, plastics or carbon fibers.

One such application is in fixtures used to lift hot newly formed bottles from the mold in which they are formed and set them down on an air pad for cooling before being conveyed to the annealing furnace. These fixtures are called takeout jaws or tongs. Since metallic takeout jaws may cause scratching or checking by contact with the hot formed bottles, takeout jaws are frequently fabricated with a non-metallic insert for contacting the hot glass. Checking, which is the formation of imperceptible cracks due to sudden localized heat transfer or thermal shock, can be, thereby, largely prevented and scratching is minimized. This is particularly important in the current production of lighter weight, more fragile bottles which require gentler handling.

Of the materials which have been used as inserts for takeout jaws, the most satisfactory to date has proven to be graphite. Although other non-metallic materials have been used, most such non-metallic materials are not completely suitable for use in lifting the hot containers from the molds. Asbestos, which was used at one time, has proved to be undesirable for safety and environmental reasons. Plastics suitable for use at the high temperatures encountered in the hot end process area must be specially formulated and yet have a relatively short service life. Graphite has been found to possess properties which are particularly adapted for contacting hot glass containers including high strength, resistance to oxidation, non abrasive surface integrity, heat resistance, low porosity and long service life.

One of the disadvantages of the takeout jaws previously available was the frequent need to replace worn parts during the course of use in the bottle-forming machine. This wear was caused largely by the movement of takeout jaw inserts within the jaw. Inserts were commonly held in position by steel detent balls positioned in holes in the takeout jaws. Detent balls were subject to wear and fouling due to the accumulation of grease, oil and foreign matter. The detent balls could hang up in their holes permitting the insert to fall out, causing loss of the insert and loss of production. Detent balls seldom provided tight enough fits of the insert to render the insert immovable within the jaw. Some degree of play between the insert and jaw was therefore almost always present.

Coupled with the fact that jaws having close tolerances could not be readily fabricated from cast bronze, the form of takeout jaws conventionally manufactured, the play between the jaw and insert resulted in wear of the insert, necessitating frequent replacement thereof. In most instances, because of the lack of close tolerances in the takeout jaws, replacement of both inserts from a pair of takeout jaws was necessary.

It would, therefore, be desirable to provide takeout jaws which reduce the wear on inserts and in which the inserts can be readily replaced in the event of wear or damage without having to replace parts of the jaws themselves.

SUMMARY OF THE INVENTION

The present invention provides takeout jaws which are designed to hold a piece of non-metallic contact material under spring tension in a manner such that the contact material does not move within the takeout jaws upon contacting a hot glass container. Because the contact material is held securely in position by spring tension, it is possible to lift the hot containers in a manner such that damage to the containers is minimized. Whereas takeout jaws which were previously used permitted a certain amount of movement of the inserts within the takeout jaws, the takeout jaws of the present invention do not permit such movement. Thus, the takeout jaws can be machined to close tolerances enabling the container lifting machine to operate as a precision machine. Because of the resulting gentle handling of the hot containers, it has become feasible to produce lighter weight glass containers and to increase the efficiency and hence the output.

A takeout jaw of the present invention comprises a generally arcuate holder for an arcuate piece of non-metallic contact material, means at the middle of the arc formed by said arcuate holder for holding said arcuate piece immovably within said arcuate holder, and means integral with said holder for attaching the jaw to a support therefor.

The takeout jaws of the present invention permit higher bottle yields and decrease the need for replacement of the contact material inserts.

BRIEF DESCRIPTION OF THE DRAWINGS

The invention will be more readily understood by reference to the accompanying drawings wherein like numerals refer to like elements and in which.

DESCRIPTION OF THE PREFERRED EMBODIMENT

The takeout jaws of the present invention permit higher bottle yields, are economically producible in small quantities and are characterized by decreased need for replacement of inserts.

The design of the takeout jaw of the present invention permits machining to close tolerances, thereby ensuring accurate and precise set up on the bottle forming machine. The precision machining of the takeout jaws combined with the tightness of the insert in the pocket of the jaw which contains the insert enables the takeout jaws to be accurately located on the bottle, in a reproducible manner, thereby reducing deformation of the bottle finish, that is, the top of the bottle, due to misalignment and consequently the number of bottles which must be scrapped. If desired, where threaded finishes are produced, the inserts can be designed to contact the threaded finish only at the root and on the underside of the threads to further decrease the likelihood of damage.

The machine fabrication of the takeout jaws of the present invention eliminates the high cost of tooling of the cast takeout jaws of the prior art and enables economic production even in relatively small quantities. Whereas the cast bronze takeout jaws of the prior art had to be manufactured in quantities of thousands of units to justify the high initial cost of tooling, the machined takeout jaws of the present invention can be manufactured economically in quantities as low as hundreds of units. Furthermore, the arcuate or semicircular shape of the takeout jaws of the present invention lends itself to being turned on a lathe. In addition, the number of parts required for the spring clip which retains the insert within a semicircular pocket in the takeout jaw is three, including spring, bolt and washer, for each takeout jaw compared to eight for the detent ball retainer, which requires two detent ball assemblies per jaw, each consisting of ball, leaf spring retainer, screw and washer.

One of the major modes of insert failure is chipping of the surface of the insert. More precise mating of the insert with the bottle finish ensured by the close tolerance machining which is possible with the semicircular design of the insert of the present invention reduces the risk of chipping. The semicircular design of the pocket in which the insert is retained and the semicircular configuration of the insert ensure that the maximum surface contact between jaw and insert is realized. Since the insert contacts a large surface area of the pocket in the jaw and since the insert is held immovably within the pocket by a single insert retaining spring which is positioned at the center of the semicircular pocket, there can be no play between the insert and takeout jaw. Thus abrasion of the bottom surface of the insert caused by such play is eliminated. Precise alignment of the takeout jaws and bottles is thus maintained, reducing damage to bottles and increasing the life of the insert.

Figure 1:
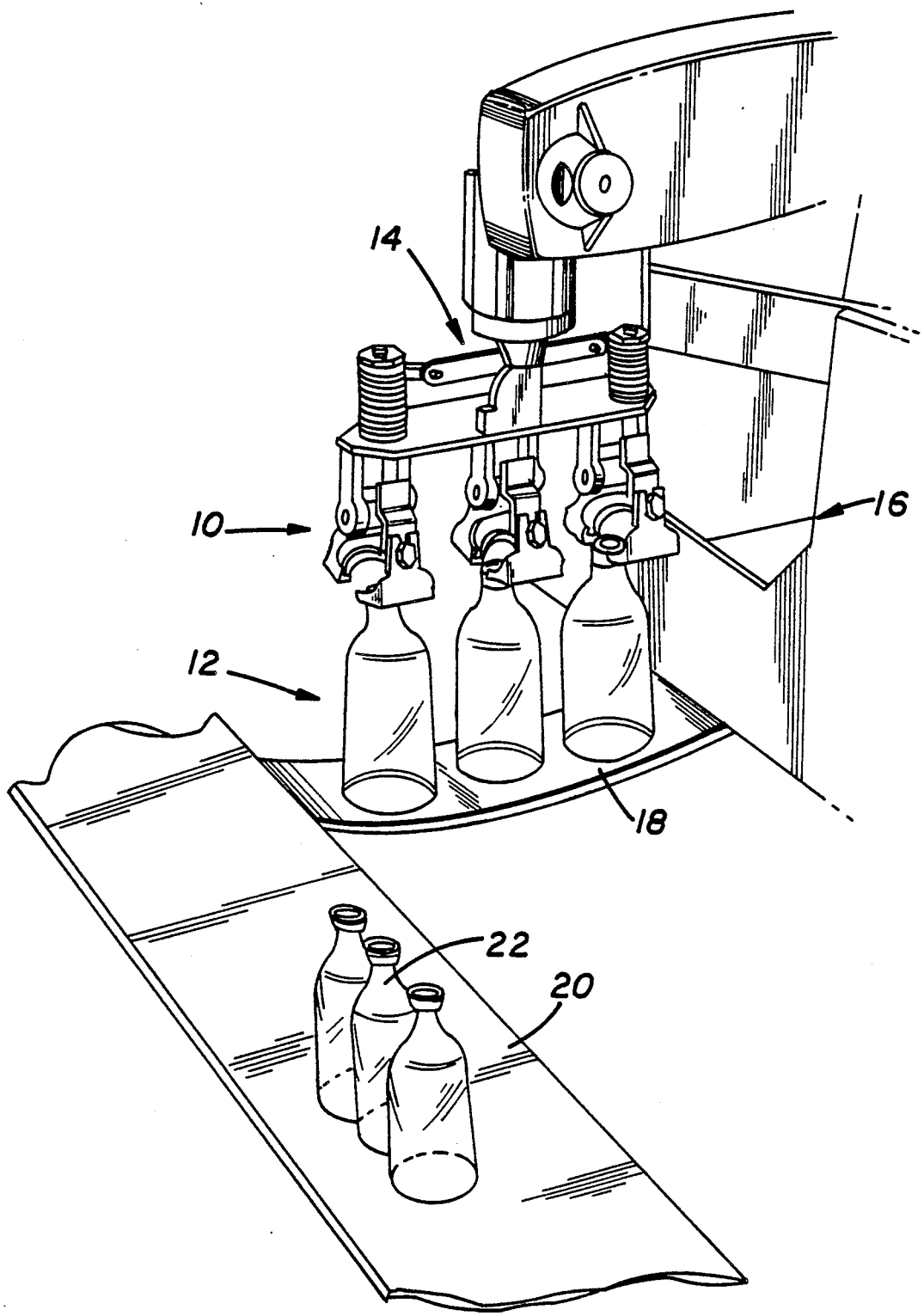
FIG. 1 is a pictorial view of the takeout area of a bottle-making machine showing takeout jaws in position over recently formed glass bottles.

Referring to the drawings, FIG. 1 depicts the environment in which the takeout jaws of the present invention are used. The number 10 represents a series of the takeout jaws of the present invention, which are positioned above a series of hot bottles 12. Takeout jaws 10 are connected to a lifting arm 14. Bottles 12 have just been removed from a bottle forming mold 16 and are suspended just above air pad 18 by a cushion of air, the source of which is not shown. Hot bottles 12, which were red hot when lifted out of the mold by takeout jaws 10, are cooled upon air pad 18 and then transferred to a conveyor belt 20 for transport to an annealing furnace, not shown. Cooled bottles 22 are shown upon conveyor belt 20.

Figure 2:
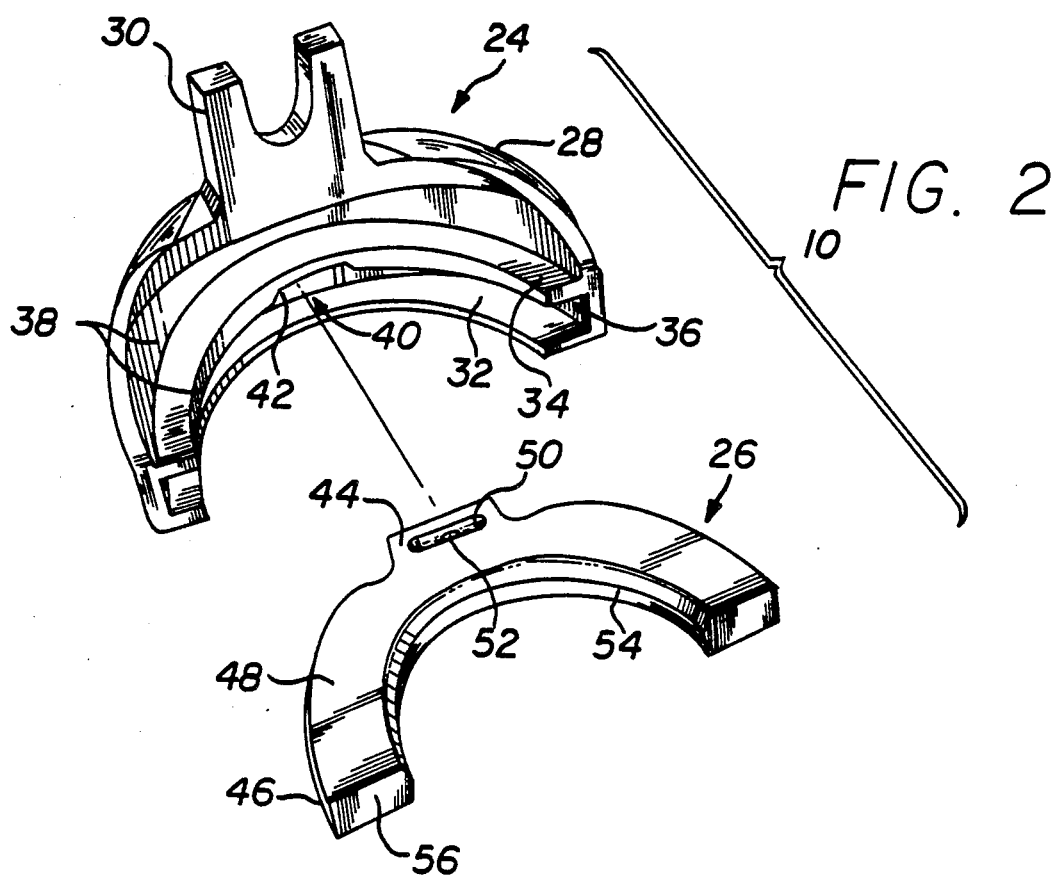
FIG. 2 is a perspective view of a takeout jaw and insert of the present invention showing the insert removed from the jaw.

Referring to FIG. 2, a single takeout jaw 24 is shown along with a mating insert 26. Takeout jaw 24 has a semicircular body 28 and a yoke 30 for attachment to a lifting arm. Body 28 has a base 32 and a shelf 34 which form between them a semicircular pocket 36. Pocket 36 is open at the front and closed at the rear by semicircular back wall 38 of body 28 except for an opening 40 in the center of back wall 38. A center portion 42 in the lower surface of shelf 34 is cut out to provide clearance for a spring clip, not shown. Insert 26 is generally semicircular in form except for a lug 44 formed by cutting notches in the back wall 46 of insert 26. The upper surface 48 of insert 26 has a depression 50 with a hole 52 in the bottom thereof. Hole 52 is used for locating or fixturing purposes in machining insert 26 to the desired dimensions.

The front surface 54 is generally semicircular except for two flat portions 56 at either end of the semicircle. If desired, front surface 54 can be threaded to provide a convenient means for contacting bottles having threaded finishes.

Figure 3:
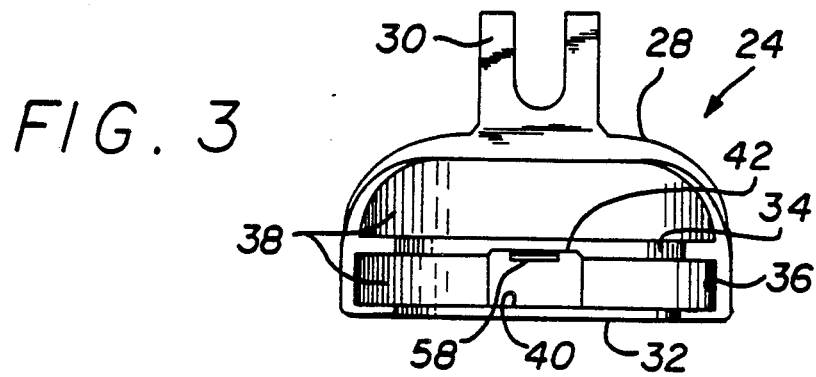
FIG. 3 is a vertical front elevation of a takeout jaw of the present invention with the insert removed.

FIG. 3, in addition to the features described with respect to FIG. 2, has a spring clip 58 shown in opening 40 at center portion 42.

Figure 4:
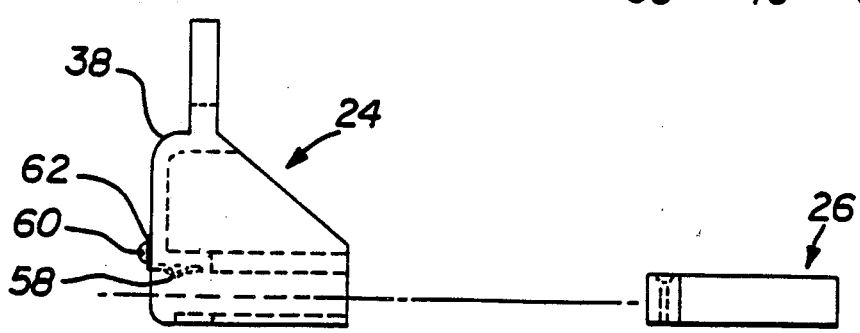
FIG. 4 is a vertical side elevation partly in cross-section of a takeout jaw and insert of the present invention showing the insert removed from the jaw.
Figure 5:
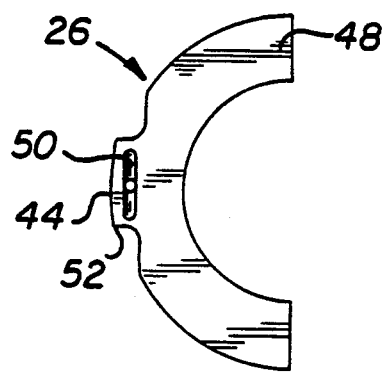
FIG. 5 is a plan view of an insert of the present invention.
Figure 6:
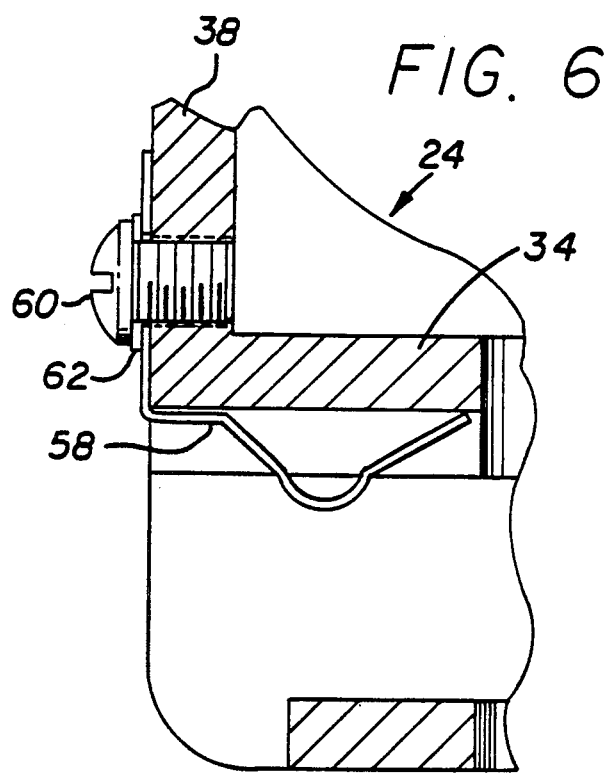
FIG. 6 is a greatly enlarged cross-section of a portion of a takeout jaw of the present invention show the spring in its untensioned condition.
Figure 7:
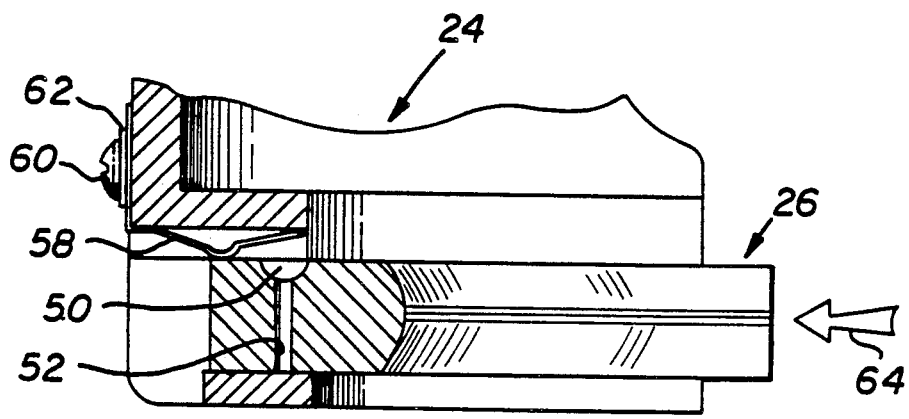
FIG. 7 is an enlarged cross-section of a portion of a takeout jaw and partially mated insert showing the spring in its fully tensioned condition.
Figure 8:
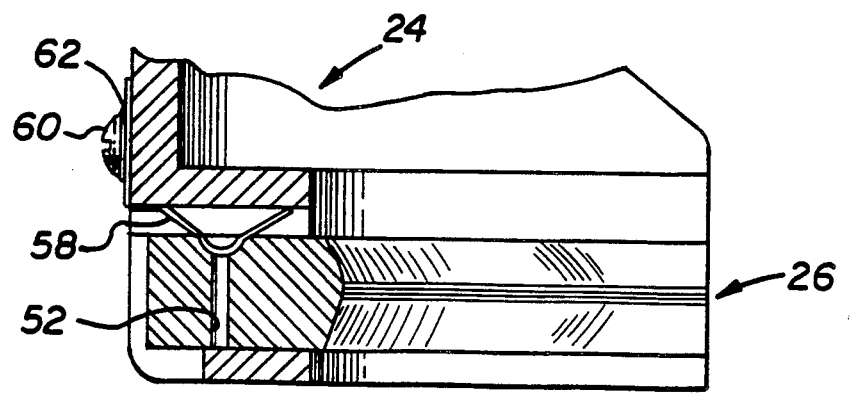
FIG. 8 is an enlarged cross-section of a portion of a takeout jaw and fully mated insert showing the spring in its untensioned condition.

FIG. 4 shows the several horizontal surfaces in phantom and also shows that the insert is adapted to be positioned within the pocket in the takeout jaw and that the spring clip and depression in the insert are lined up to be engaged. Spring clip 58 is attached to back wall 38 of takeout jaw 24 by means of a screw 60 and a washer 62.

FIGS. 5, 6, 7 and 8 illustrate how the insert fits within the takeout jaw. As can be seen from these figures, the spring clip is normally untensioned as shown particularly in FIG. 6. As the insert is pushed in the direction shown by arrow 64, the lug 44 engages spring clip 58 and causes it to become tensioned. Then, when the insert is pushed all the way in, spring clip 58 is snapped into depression 50 and becomes untensioned as in FIG. 6. Removal of insert 26 from takeout jaw 24 will then require exertion of a large force to tension spring clip 58 allowing removal of insert 26 from takeout jaw 24.

As pointed out above, graphite is the material of choice for fabricating the takeout jaw inserts of the present invention. Various grades of graphite are commercially available. A particularly desirable material is a fine particle, high strength, isotropic graphite available from POCO Graphite, Inc., a subsidiary of UNOCAL Corporation, Decatur, Texas, which is sold as GLASSMATE$^R$ graphite contact material.

While particular embodiments of the invention have been described, it will be understood, of course, that the invention is not limited thereto, since many obvious modifications can be made. It is intended to include any such modifications as will fall within the scope of the appended claims.

We claim:

1. A takeout jaw assembly comprising the combination of
   (a) a takeout jaw comprising
   a semi-circular base having a wall having front and rear edges;
   a semi-circular shelf perpendicular to said wall, forming a pocket with said base;
   a top parallel to said base extending from said wall towards said front edge of said base;
   a yoke perpendicular to said top and extending therefrom; and
   a spring clip attached to the outside of said wall and extending through an opening in said wall formed by cut-outs in said wall, said shelf and said base; and
   (b) a non-metallic contact material insert comprising a semi-circular body having front and rear edges; and
   a lug formed at said rear edge of said body by cut-outs therein, said lug having a depression extending substantially parallel to said rear edge of said body;
   said spring clip and said depression being in mating relation to retain immovably said insert within said pocket.

2. An assembly according to claim 1 wherein said insert is fabricated of graphite.

3. An assembly according to claim 2 wherein said takeout jaw is fabricated of machined steel.

4. A takeout jay assembly for handling glass articles comprising:
   (a) a semicircular base comprising a wall member having upper and lower, radially inwardly projecting, shelf members, said shelf members and wall member forming a recess;
   (b) a substantially semicircular, non-metallic insert located in the recess, said insert having an inwardly projecting edge extending beyond said shelf members for contact with glass articles to be handled; and
   (c) means for retaining said insert in said recess, said means comprising a spring affixed to the wall member and engaging a surface of the insert.

5. The assembly of claim 4 wherein the insert comprises graphite.

6. The assembly of claim 5 wherein said base is fabricated of machine steel.

7. The assembly of claim 2 wherein said insert has a depression formed in a surface adjacent a rear edge for receiving said spring.

8. A takeout jaw assembly for grasping glass bottles comprising:
   (a) an arcuate base comprising a wall member and radially inwardly extending, substantially parallel, top and bottom shelf members, said shelf members and wall defining a recess;
   (b) a semicircular bottle contacting body located in said recess and having a radially inwardly extending edge for contacting said bottles, said body having a depression adjacent a rear edge thereof; and
   (c) means for retaining said body in said recess, said means comprising a flat spring attached to an outer surface of the wall member, extending through an opening in the wall and having an end for engaging the depression in the contacting body.

9. The assembly of claim 8 wherein the base comprises machine steel.

10. The assembly of claim 9 wherein said semicircular body comprises graphite.

11. The assembly of claim 10 wherein said base further includes a yoke member extending upwardly from said wall for engagement with a lifting means.

12. The assembly of claim 11 wherein said spring is attached to the wall by a threaded fastener.

* * * * *